US006581729B1

United States Patent
Moriwaki

(10) Patent No.: US 6,581,729 B1
(45) Date of Patent: Jun. 24, 2003

(54) BRAKE CABLE-FIXING DEVICE FOR A PARKING BRAKE

(75) Inventor: Koji Moriwaki, Nagoya (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/705,726

(22) Filed: Nov. 6, 2000

(51) Int. Cl.[7] ............................................. F16D 65/14
(52) U.S. Cl. ................................. 188/2 D; 188/106 A
(58) Field of Search .......................... 188/2 D, 106 F, 188/106 P, 325, 79.57

(56) References Cited

U.S. PATENT DOCUMENTS

| | | | |
|---|---|---|---|
| 1,959,878 A | * 5/1934 | Schroeder | 188/21 |
| 2,259,266 A | * 10/1941 | Rabe | 188/79.51 |
| 5,143,124 A | * 9/1992 | Froment | 403/157 |
| 5,964,253 A | * 10/1999 | Fumex | 403/157 |

FOREIGN PATENT DOCUMENTS

| | | | |
|---|---|---|---|
| DE | 43 07 861 A | | 9/1994 |
| EP | 1 041 301 A2 | | 10/2000 |
| JP | 62-98034 A | * | 5/1987 |
| JP | 07-12153 A | * | 1/1994 |
| JP | 06-337027 A | * | 12/1994 |
| JP | A 08-326788 | | 12/1996 |
| JP | A 2000-108855 | | 4/2000 |

* cited by examiner

Primary Examiner—Douglas C. Butler
Assistant Examiner—Robert A. Siconolfi
(74) Attorney, Agent, or Firm—Apex Juris, pllc; Tracy M Heims

(57) ABSTRACT

A compact mechanical shoe actuating mechanism with an improved lever-ratio comprises a space 42 formed by two facing plates 40a and 40b of a strut designed such that an upper side of the space 42 is longitudinally wider than a lower side of the space 42 where the cable end nipple 52 is inserted in and is inclinedly passed through.

11 Claims, 8 Drawing Sheets

BRAKE CABLE-FIXING DEVICE FOR A PARKING BRAKE

BACKGROUND OF INVENTION

1. Field of the Invention

This invention relates to an improvement in a traditional brake cable-fixing device for a parking brake, in which the improvement affords an easy, effective and efficient installation of the brake cable onto a brake lever.

2. Description of Related Art

FIG. 8 shows a conventional mechanical shoe actuating mechanism as is disclosed in the U.S. Pat. No. 5,311,793, the disclosure of which is hereby incorporated by reference. This mechanism involves components comprising a strut (pressure bracket) a, a brake lever (actuating lever) b, a plate spring (elastic spring leg) c, and a brake cable d.

The strut a has a space $a_1$ formed from its intermediate portion toward its left end, and the brake lever b positioned in the space $a_1$ is pivotally supported by a pin e.

In addition, the left bottom side of the space $a_1$ is formed in a rectilinear shape. The strut a has a plated section at its right side, and a notched groove $a_2$ is formed at the middle of the plated section. A right brake shoe (spacing lever) f engages the notched groove $a_2$.

The brake lever b is an integration of two plates, wherein forked legs are formed at each right end with a gap $b_1$. The gap $b_1$ is so designed and sized to permit an inner cable $d_1$ of the brake cable d to pass through, but a nipple $d_2$ fixed to the top end of the brake cable d is blocked against passage through the gap $b_1$. Therefore, the nipple $d_2$ is hooked on a groove $b_2$ formed on the forked legs.

The left side of the brake lever b is positioned between two unconnected facing plates of the strut a (see FIG. 8B) and is pivotally, rotatably supported with respect to the strut a by the pin e. The brake lever b has an engagement groove $b_3$ adjacent to that pivot section and engaged with a left brake shoe g.

The plate spring c is in the shape of an open clasp comprised of a pair of elastic spring legs $c_1$, $c_2$, each connected at one end with a vertex. One elastic spring leg $c_2$ is urged against curved outer edges $b_4$ of the forked legs at the free end of the brake lever b closing a gap between the curved outer edges $b_4$ and the space $a_1$, and the other elastic spring leg $c_1$ opposite to the elastic spring leg $c_2$ angled at its free end is hooked on the right bottom of space $a_1$ of the strut a.

When the brake cable d hooked on the brake lever b upwardly in FIG. 8A is pulled, the brake lever b rotates counterclockwise with respect to the pin e, thereby pushing the brake shoe g to the left and pushing the brake shoe f to the right by a reaction force thereof, and thereby rotating the pair of brake shoes f and g to spread apart.

The brake cable d is installed on the brake lever b in the following manner. The brake cable d is inserted from an upper part of the FIG. 8A, and the nipple $d_2$ advances in the space a, along the curved outer edges $b_4$ of the brake lever b at its free ends, deflecting the elastic spring leg $c_2$ of the plate spring c.

As the brake cable d is further pushed toward the elastic spring leg $c_2$ so as to cause the nipple $d_2$ to slide along and pass the curved outer edges $b_4$ of the brake lever b, the nipple $d_2$ is snapped in and is positioned to be engaged with the groove $b_2$ of the brake lever b by a restoring force exerted by the elastic spring leg $c_2$. Accordingly, the brake cable d is positioned between the forked legs of the brake lever b while the nipple $d_2$ is positioned on the groove $b_2$ of the brake lever.

When the spring leg $c_2$ of the plate spring c is attached to the spring leg $c_1$, a gap between the spring leg $c_2$ and the curved outer edges $b_4$ of the brake lever b must be sufficient for the nipple $d_2$ to be passed through.

With reference to FIG. 8A, if the letter L stands for a distance from a pivot point between the strut a and the brake lever b to a position where the brake cable d is pulled, and if the letter H stands for a distance from the pivot point between the strut a and the brake lever b to the brake shoe g, a lever-ratio in the mechanical shoe actuating mechanism may be represented as L/H.

Effectiveness of the parking brake may be improved if the lever-ratio in the mechanism for mechanical operation becomes higher by setting the entire length of the strut a and the distance L from the pivot point between the strut a and the brake lever b longer. However, such a design causes a problem of enlarging the mechanism and a problem of complexity of the layout in the drum brake.

On the other hand, if the mechanism is downsized and the distance L is shortened, the lever-ratio becomes smaller ultimately reducing the effectiveness in an undesirable manner. The need therefore exists for a brake cable-fixing device that is smaller in size without sacrificing lever-ratio.

SUMMARY AND OBJECT OF THE INVENTION

This invention was made to improve the above-points, and its object is to provide a brake cable-fixing device for a parking brake pursuing a downsized mechanism with the larger lever-ratio.

In accordance with this invention, an entire length of the strut may be shortened without lowering the lever ratio of the mechanical shoe actuating mechanism by designing the space formed between two facing plates of the strut such that its upper half side is longitudinally wider than its lower half side. Therefore, this invention enables to design the mechanism not only to be smaller but also to improve the lever-ratio at the same time.

Since an entire length of the mechanical shoe actuating mechanism is substantially shortened and compactly designed, this invention is suitable for a drum brake utilized in a small size vehicle and has a significant economic effect.

The space of the strut may be formed simultaneously at the time the strut is formed by press. This facilitates the forming process and reduces the manufacturing cost.

The grooves on one ends of brake lever and the nipple of the brake cable are designed to be semicircular, thus providing an engagement between the facing surfaces and allowing smooth movement. Therefore, durability of the engagement section increases, and the inner cable under the nipple is not repeatedly deflected when operating the parking brake.

This invention maintains a low amount of horizontal movement in the pivot section between the brake lever and the strut even if the section makes a slight yawing movement, thereby providing assured engagement of the nipple and the inner cable with the brake lever.

A funnel-shaped or flared-out portion may be formed at an entry portion of the strut into which a nipple of the brake cable is inserted. This facilitates an insertion of the nipple into a drum brake already installed onto the vehicle with a brake drum and gives superior brake cable installability.

BRIEF DESCRIPTION OF THE DRAWINGS

The above and other object and the attendant advantages of the present invention will become readily apparent by reference to the following detailed description when considered in conjunction with the accompanying drawings wherein.

DETAILED DESCRIPTION OF THE INVENTION

The first embodiment of this invention is explained with reference to FIGS. 1–3 in the following section.

Figure 1:
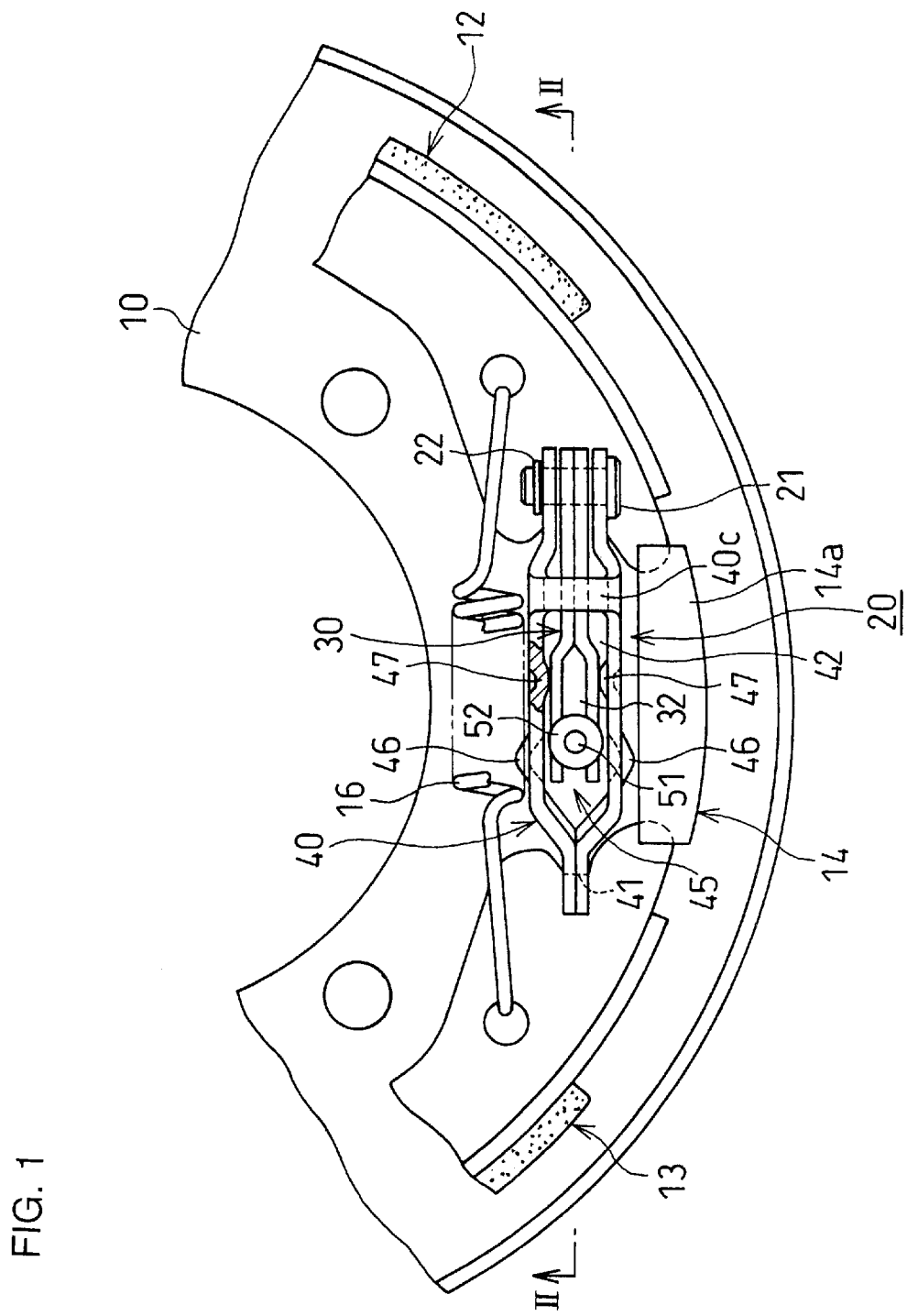
FIG. 1 is a partial plan view of a drum brake equipped with a mechanical shoe actuating mechanism with respect to a first embodiment of this invention.

FIG. 1 is a partial plan view of a drum brake equipped with a mechanical shoe actuating mechanism 20. FIG. 2 is a cross-section view of the FIG. 1 taken along the line II—II, and FIG. 3 is an exploded view of the mechanical shoe actuating mechanism.

As base components, the drum brake has a back plate 10 and a stiffener 11 on which the back plate 10 is superposed and fixed, both of which will be fixed on a stationary part of the vehicle, i.e., a vehicle body.

A pair of brake shoes 12 and 13 is operated in connection with other components of the drum brake and is movably provided on the back plate 10. A shoe supporting portion 14a of an anchor block 14 supports one adjacent end of the brake shoes 12 and 13, and the other adjacent end of the brake shoes 12 and 13, not shown in FIG. 1, are connected with a linking member.

The anchor block 14 is designed to be substantially L-shaped, and a seat portion 14b is tightly fixed on the back plate 10 and the stiffener 11 with two bolts 15 in order to provide a stable shoe support. A shoe return spring 16 is stretched between the brake shoes 12 and 13.

In addition, the mechanism for mechanical operation for brake shoes 12, 13 comprises members such as a brake lever 30, a strut 40, a brake cable 50, and other conventional component known to those of skill in the art. The brake lever 30 and the strut 40 are positioned adjacent to the shoe supporting portion 14a of the anchor block 14 and are extended between the pair of brake shoes 12 and 13.

The brake lever 30 comprises two facing plates, i.e., forked legs 30a and 30b, securing a gap 32 in between and at the free ends, i.e., at the left side in FIG. 3, of the two forked legs 30a and 30b, through which a later described inner cable 51 of the brake cable 50 is to be inserted. Further, the brake lever 30 has arc-shaped grooves 33 and 33, at the free ends to catch a cylindrical cable end nipple 52 fixed on a top end of the inner cable 51, making an engagement between the two. Outer edges 30c and 30d at the free ends of the two forked legs 30a and 30b are designed to be semicircular.

Figure 2:
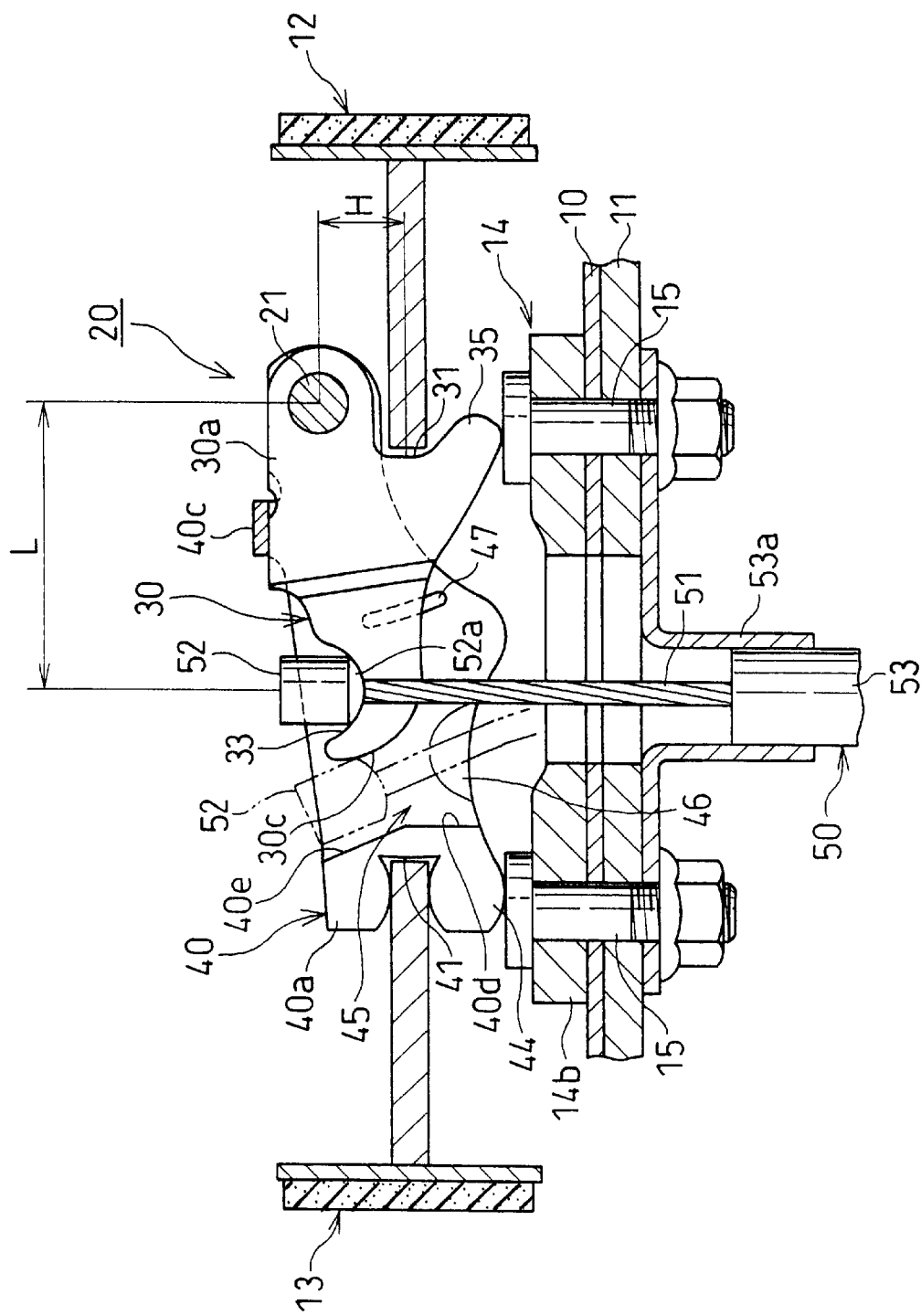
FIG. 2 is a cross-section view of FIG. 1 taken along the line II—II.
Figure 3:
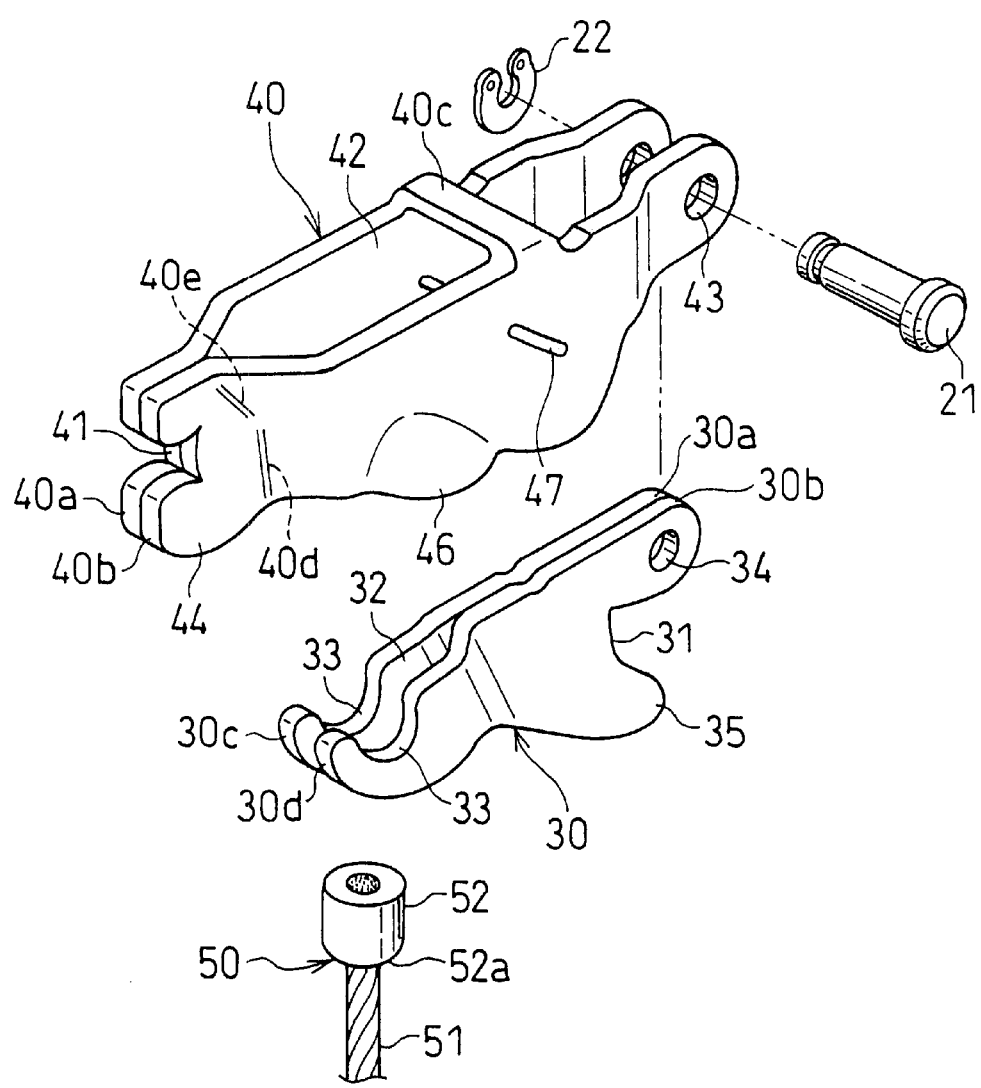
FIG. 3 is an exploded view of the mechanical shoe actuating mechanism shown in FIG. 1.

The two forked legs 30a and 30b at the right side of FIG. 3 are integrally superposed by a means such as welding or other fastening means known to those of skill in the art. A first engagement groove 31 is formed in the forked legs 30a, 30b for engagement with one brake shoe 12 and a first pin hole 34 is formed to receive a pin 21. In addition, a first trigger-shaped protrusion 35 formed at an opposite side of the first pin hole 34 slidably abuts on a top of the bolt 15 (see FIG. 2).

The strut 40 also comprises two facing plates 40a and 40b, and a bridge 40c positioned intermediate in the longitudinal direction thereof for interconnecting the two facing plates 40a, 40b.

At the left side of the strut 40, the facing plates 40a and 40b are superposed to be integrated such as by welding and the like and the strut 40 at which defines a space 42 between the two plates 40a, 40b at its intermediate portion (see FIG. 3).

A second engagement groove 41 is formed at the left side in FIG. 3 on the superposed portions of the plates 40a and 40b for making an engagement with the other brake shoe 13 while second pin holes 43, 43 are formed on the other side of the plates 40a and 40b, i.e., at the right side in FIG. 3. In addition, the second protrusion 44 below the second engagement groove 41 slidably abuts on the top of the bolt 15 (see FIG. 2).

The brake lever 30 is disposed in the space 42 of the plates 40a, 40b and is rotatably supported relative to the strut 40 by the pin 21 which is inserted in the second pin holes 43, 43 of the strut 40 and the first pin hole 34 of the brake lever 30. A clip 22 secures the pin 21 in place at its top end. The brake lever 30 is restricted in its clockwise rotation in FIG. 2 by abutting the bridge 40c of the strut 40.

In order to install brake cable 50 on the brake lever 30, a sufficient entry space 45 is reserved around a point between the outer edges 30c and 30d at the free end of the brake lever 30 and the superposed portion of the strut 40, i.e., wall 40d of the space 42, so that the cable end nipple 52 may be passed through that entry space 45.

Further, as shown in FIG. 2, the wall 40d, which forms the entry space 45 within the space 42 of the strut 40, is designed to be widened toward the upper side in FIG. 2, dividing into two sections, i.e., a lower half where the nipple 52 is inserted and an upper half where the nipple 52 is to be passed through immediately after the lower half. Here, the space 42 at the left side of the strut 40 is shaped to have its upper half wider in the longitudinal direction (along the sectional view of FIG. 2) than the lower half, thereby allowing the nipple 52 to be inclined as it passes in the entry space 45.

Furthermore, the facing plates 40a and 40b have bent inclinations and an ramped surface 40e at the wall 40d, so designed that the upper half of the space 42 at the left side of the strut 40 becomes wider as it goes toward the top of the space 42, i.e., in the opposite direction of the brake cable 50 being pulled.

In addition, to facilitate the insertion of the nipple 52, funnel-shaped or flared-out portions 46, 46 expand the space between and toward the bottom of the two, i.e., toward the entry side of the nipple 52.

Moreover, projections 47, 47 project toward one another in the middle of the facing plates 40a and 40b in the longitudinal direction, thereby restricting an amount of side-to-side movement, i.e., a yawing movement toward the facing plates 40a and 40b taking its pivot section as the fulcrum, of the brake lever 30 at the arc-shaped groove side.

The projections 47, 47 may alternately be positioned on the brake lever 30. In addition, as another means to restrict the yawing movement of the brake lever 30, dimensional precision may be maintained by such as coining and anti-distortioning the parts instead of using the projections 47 and 47.

A drum brake side of the brake cable 50 comprising an inner cable 51, an outer casing 53 and so on may be positioned as follows.

A bracket 53a fixed on an end of the outer casing 53 is fixed with the back plate 10 by the bolts 15 and 15.

The inner cable 51 slidably inserted within the outer casing 53 has the nipple 52 at its top end, and an engagement surface 52a of the nipple 52 makes an engagement with the arc-shaped grooves 33, 33.

Curvature of this arc-shaped engagement surface 52a is preferably set to be a smaller radius than that of the arc-shaped grooves 33, 33. By keeping the curvature of the arc-shaped engagement surface 52a within the preferable range, any rotation of the brake lever 30 at the engagement section between the arc-shaped grooves 33, 33 and the engagement surface 52a is allowed even if a rotation angle of the brake lever 30 is varied during the operation, thereby maintaining linearity of the brake cable 50. Also it helps to increase the durability of the engagement section and to prevent deformation of the inner cable 51 immediately below the nipple 52.

The following section explains a process of installing the brake cable 50. The brake cable 50 may be preinstalled in the drum brake; however, for the sake of convenience in handling the drum brake, this section deals an example of the installation process of the brake cable 50 in the drum brake already mounted on the vehicle.

The nipple 52 fixed on the inner cable 51 is inserted from outside of the brake through holes of the stiffener 11, the back plate 10, and the seat portion 14b of the anchor block 14, and the nipple 52 is inserted into the funnel-shaped or flared-out portions 46, 46 of the strut 40.

As shown by a dotted chain line in FIG. 2, when the nipple 52 passes through the entry space 45 of the entry side of the space 42, the nipple 52 is advanced in the space between the wall 40d of the space 42 of the strut 40 and the brake lever 30 along its curved outer edges 30c and 30d.

At that time, a clockwise rotational force (torque about the pin 21) is exerted on the brake lever 30 but does not rotate the brake lever 30 since the top edge of the brake lever 30 abuts against the bridge 40c of the strut 40.

As the inner cable 51 is further inserted and the nipple 52 reaches the inclined portion of the space 42 at its upper half of the entry space 45, a peripheral surface of the nipple 52 is pushed against the curved outer edges 30c and 30d and is inclinedly moved toward the ramped surface 40e at the left side of FIG. 2. At this moment, the inner cable 51 is caused to be bent thereby generating a self-restoring force, which tends to urge the bent inner cable 51 and nipple 52 toward the solid-line position shown in FIG. 2.

When the nipple 52 passes over the outer edges 30c and 30d of the brake lever 30, the self-restoring force generated in the inner cable 51 leads the inner cable 51 in the gap 32 of the brake lever 30 and the nipple 52 engages with the arc-shaped grooves 33, 33 of the brake lever 30.

Then, the bracket 53a of the outer casing 53 is fixed on the stiffener 11 by the bolts 15 and 15, which complete the process of installing the brake cable 50 in the drum brake.

When detaching or removing the brake cable 50 from the drum brake, as opposed to the above-described process; the bolts 15,15 are unscrewed from the bracket 53a and the nipple 52 is pushed up toward the opposite direction of the brake cable 50 being pulled; and an external force is applied on the brake cable 50 to forcibly inclinedly pull back the nipple 52 into the entry space 45.

The space 42 of the strut 40 is so designed that the upper half is to be longitudinally wider than the lower half, i.e., entry side. Therefore, at the time the nipple 52 of the brake cable 50 is inserted, the nipple 52 is inclinedly passed within the inclined portion of the space 42.

Accordingly, without reducing (sacrificing) the lever-ratio, i.e., L/H, an entire length of the strut 40 may be shortened, thereby providing a compact design.

Figure 8A:
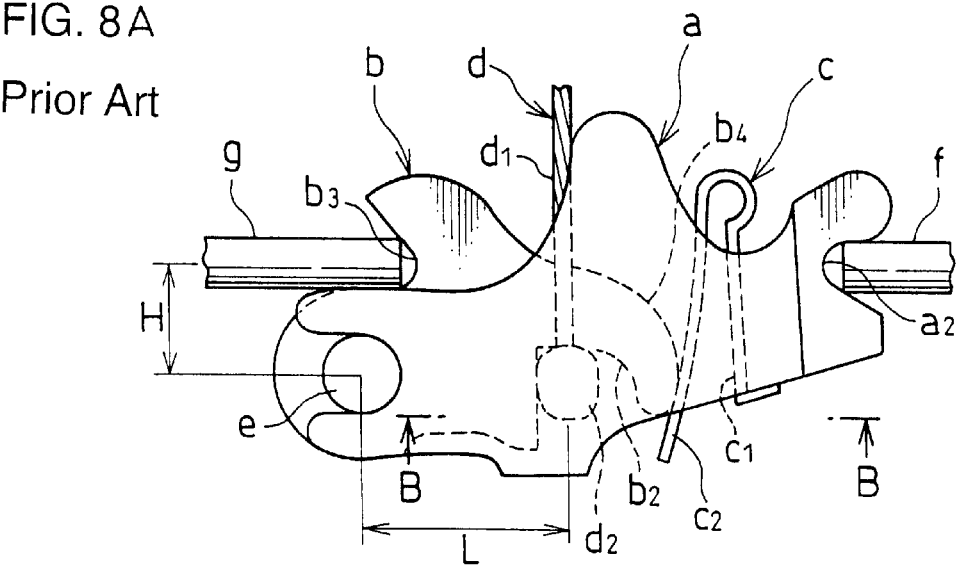
FIG. 8A is a front view of a section functioning as the conventional mechanical shoe actuating mechanism.
Figure 8B:
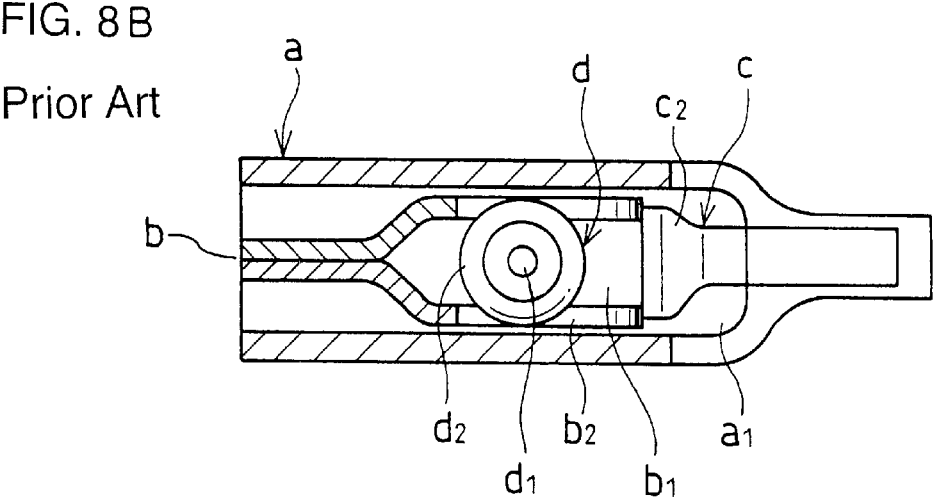
FIG. 8B is a cross-section of FIG. 8A taken along the line VIII—VIII.

In addition, a spring means may be employed as in the traditional device. In that case, an elastic spring leg, i.e., the elastic spring leg $c_1$ in FIGS. 8A and 8B, of the spring means may be positioned along the ramped surface 40e in the space 42 of the strut 40.

If the inner cable 51 from the side not shown in the Figures is pulled, the brake lever 30 in FIG. 2 is rotated counterclockwise with the pin 21 to push the brake shoe 12, thereby generating a counter force moving the strut 40 to the left to push the brake shoe 13. As a result, the pair of brake shoes 12 and 13 spread apart each other to make frictional engagement with a brake drum not shown in the Figures.

In FIG. 1, if the brake drum rotates clockwise, the brake shoe 12 is supported by the anchor block 14 to generate a braking force. If the brake drum rotates counterclockwise, the brake shoe 13 is supported by the anchor block 14 to generate a braking force.

Another embodiment of this invention is explained next. For simplifying the explanation of this invention, this second embodiment uses the same reference numbers and signs increased by an order of 100 for identical or nearly identical parts or components of the first embodiment, and the detailed explanation of such parts or components will be omitted hereinafter.

Figure 4:
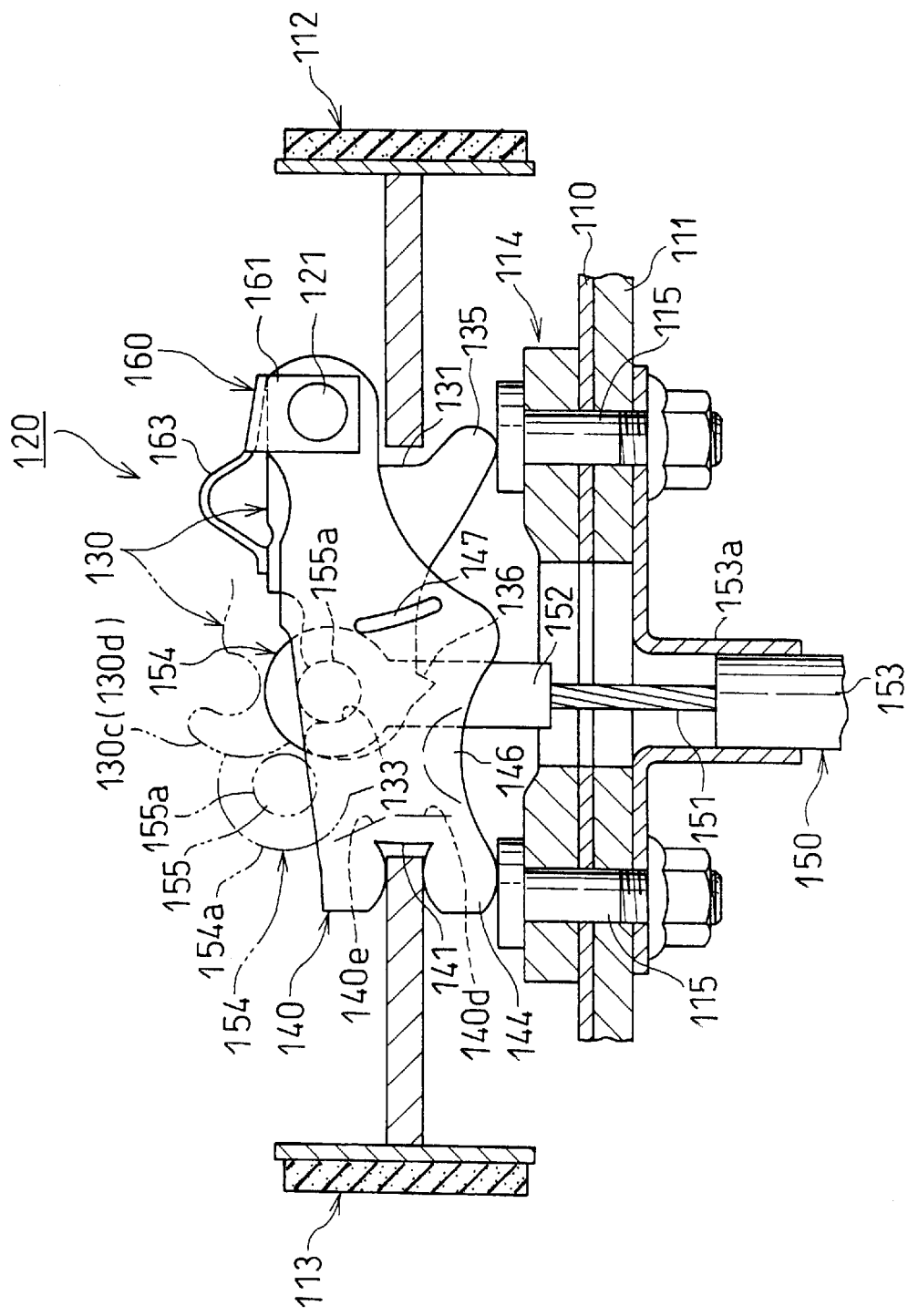
FIG. 4 is a cross-section view of the mechanical shoe actuating mechanism explaining another embodiment of this invention employing a spring means to restrict the rotation of the brake lever in the opposite direction of the brake cable being pulled.
Figure 5:
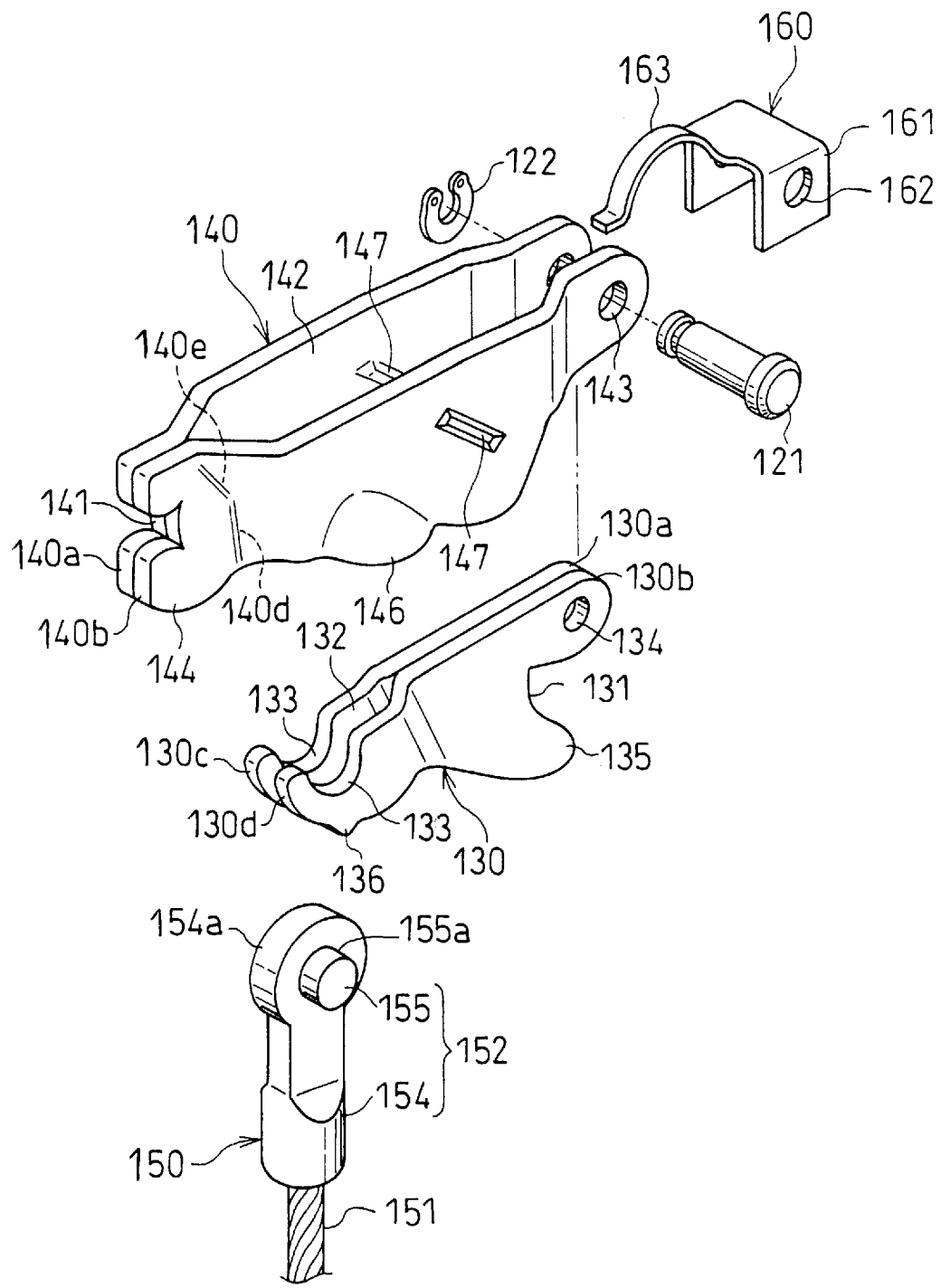
FIG. 5 is an exploded view of the mechanical shoe actuating mechanism shown in FIG. 4.

With reference to FIGS. 4 and 5, another shoe actuating apparatus is explained, which is equipped with a different shape of the nipple 152 with a plate spring 160 as a means to restrict rotation of the brake lever 130 in the opposite direction of the brake cable 150 being pulled.

The plate spring 160 has a pivot cover 161 and a curved leg 163. The pivot cover 161 is shaped in a rectangle without a vertical line in cross-section and covers over the pivot section of the strut 140. Further, the pivot cover 161 has a hole 162, on its both edges, into which the pin 121 is inserted for the installation. The curved leg 163 integrally extends from the pivot cover 161, and its top end slightly elastically contacts with the top surface of the superposed portion of the brake lever 130 similar in function to the bridge 40c described in the first embodiment.

For the installation of the brake cable 150, the nipple 152 inserted and pushes the brake lever 130 causing its slight upward rotation with the pin 121. After the nipple 152 passes by the brake lever 130, the curved leg 163 is designed to possess a restoring force capable of retracting the brake lever 130 to its initial position.

Further, for a spring means to retract the brake lever 130 to the initial position (i.e., a means to apply a restoring force in the direction of the brake cable being pulled), a wire spring (not shown in Figures) may be substituted instead of the plate spring 160 in this embodiment.

The nipple 152 of the brake cable 150 is formed by pressing one side of a round bar to be plated leaving the other side round, shaping the top of the pressed side to be a horizontal cylindrical head, and shaping the rest of the pressed section rectangular, thereby constituting a nipple body 154. Each flat side surfaces of the horizontal cylindrical head has cylindrical lugs 155 projecting evenly in the middle of both flat side surfaces. Alternatively, the cylindrical lugs 155 may be a circular pin pushed into and projected at both flat side surfaces. The other round side of the nipple 152 is a tube in which an inner cable 151 is inserted and securely fixed to the inner cable 151. In addition, the nipple 152 may be an integral kind produced by an aluminum die-cast process if the inner cable 151 is simultaneously inserted while casting.

In addition, the nipple 152 may be an integral kind produced by an aluminum die-cast process if the inner cable 151 is simultaneously inserted while casting.

The embodiment of FIGS. 4 and 5 employs a cross-shaped nipple 152 when viewed from its side. However, the nipple 152 may be formed in a T-shape by moving the cylindrical lugs 155 to the upper end of the nipple 152.

The second embodiment, like the first embodiment, employs the same shape of the space 142 of the strut 140 at its left side, in which the upper half is wider in the longitudinal direction of the strut 140 than the lower half.

A convex or concave contact segment 136 may be formed on a peripheral surface of the brake lever 130 opposite the arc-shaped grooves 133, 133 of the brake lever 130. The contact segment 136 is reachable by a tool, such as a screwdriver, inserted from outside of the brake.

A process of installing or detaching the brake cable will now be explained with reference to the second embodiment.

For the installment of the brake cable 150, first, the nipple 152 fixed on the inner cable 151 of the brake cable 150 is inserted in the funnel-shaped portion 146 from outside of the brake.

As the inner cable 151 is further pushed, the plated portion of the nipple body 154 is led into the gap 132 of the brake lever 130 and the peripheral surfaces 155a, 155a of the cylindrical lugs 155, 155, projecting from both sides of the nipple 152, abut against and push the outer edges 130c and 130d of the brake lever 130 to push them up causing their upward rotation with the pin 121 as shown in doffed lines in FIG. 4.

During the above process, the largest circumferential surface 154a of the other end of the nipple body 154 slides in the inclined portion of the space 142 of the strut 140, and the nipple 152 inclines to depart from the brake lever 130. As the nipple 152 inclines, a self-restoring force is generated in the inner cable 151.

After rotating the brake lever 130 to slight degrees, the cylindrical lugs 155, 155 of the nipple 152 pass by the outer edges of the brake lever 130, and an urging force of the curved leg 163 of the plate spring 160 retracts the brake lever 130 to the initial position. At the same time, the self-restoring force generated in the inner cable 151 makes an engagement between the cylindrical lugs 155, 155 and the arc-shaped grooves 133, 133 of the brake lever 130. Then, the installation of the brake cable 150 is completed by fixing the bracket 153a of the outer casing 153 on the stiffener 111 by the bolts 115.

To detach the brake cable 150, first, the bracket 153a of the outer casing 153 is removed, and the inner cable 151 is pushed back to displace the cylindrical lugs 155, 155 from the arc-shaped grooves 133, 133 of the brake lever 130. Then, the nipple 152 is forcibly moved to the left in FIG. 4.

Finally, the brake cable 150 is detached from the brake as the nipple 152 is removed while a tool such as a screwdriver pushes against the contact segment 136 of the brake lever 130.

In addition, the nipple 152 in this embodiment may be substituted for the one in the first embodiment, and the cable end nipple 52 in the first embodiment may be substituted for the one in this embodiment.

Figure 6:
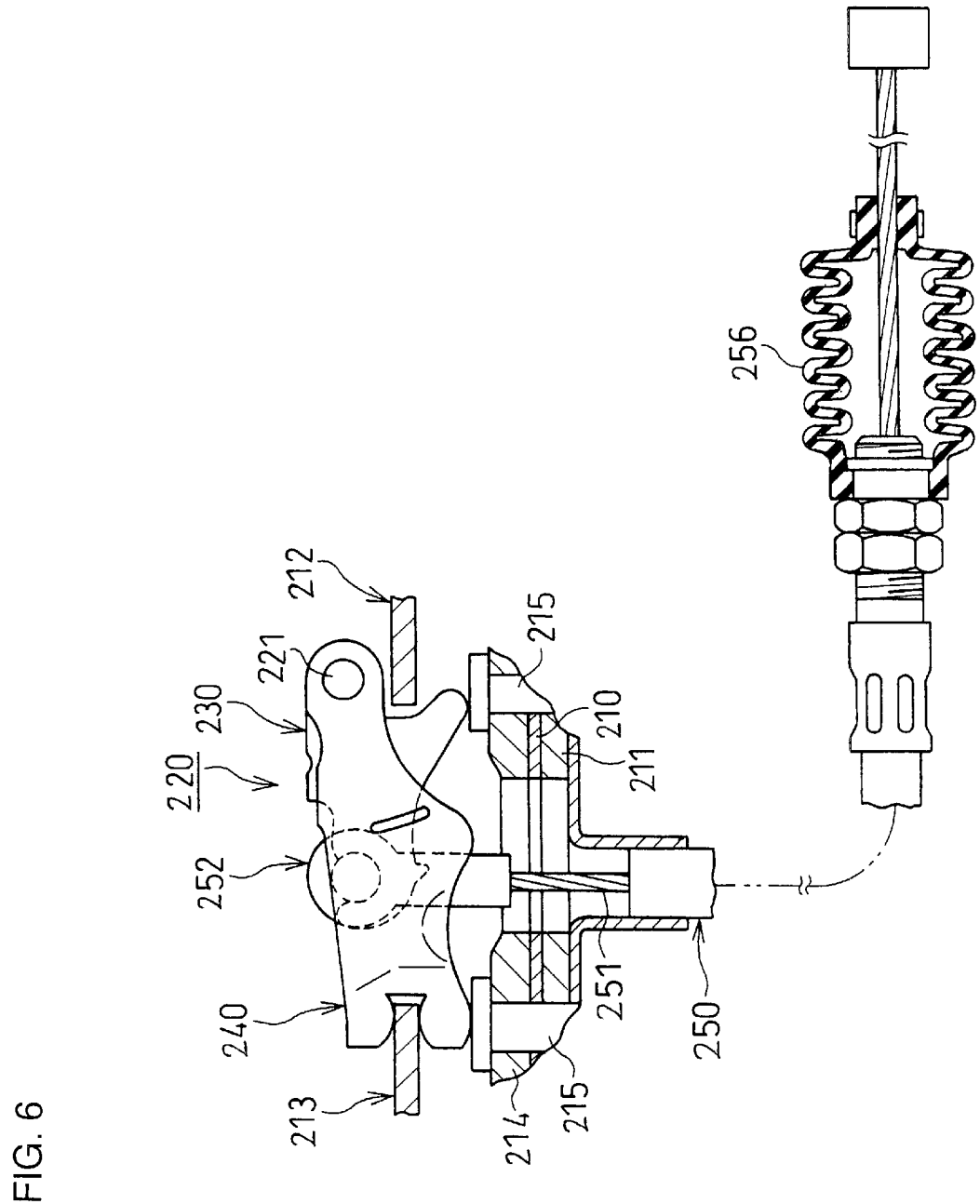
FIG. 6 is an explanation view of another embodiment of this invention employing a dust boots of the brake cable as an elastic means.

A third embodiment is shown in FIG. 6. Here, instead of the plate spring 160 described in the above second embodiment of this invention, the brake lever 230 may be retracted by an elastic force of a dust boot 256 covering an input side (opposite side from the mechanical shoe actuator 220) of the brake cable 250 as shown in FIG. 6.

Figure 7A:
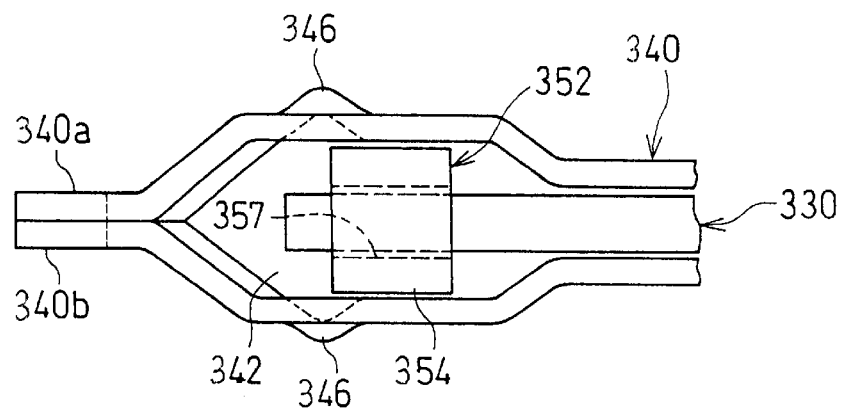
FIG. 7A is a plan view of section positioning the brake cable with respect to another embodiment of this invention, the brake lever comprising one plate.
Figure 7B:
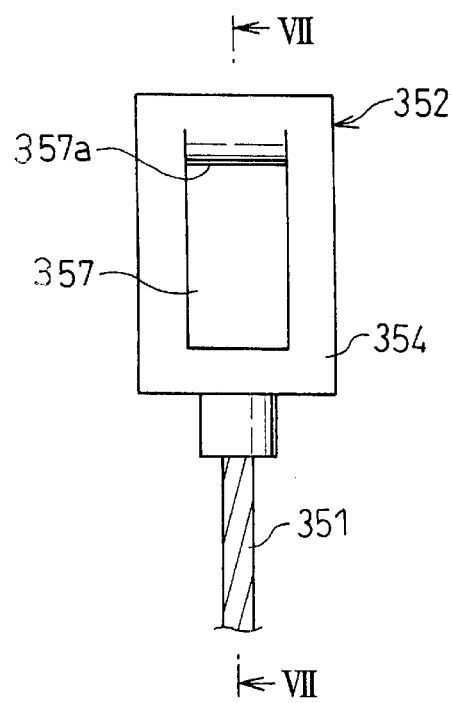
FIG. 7B is a side-view of a square nipple with a hole in the middle.
Figure 7C:
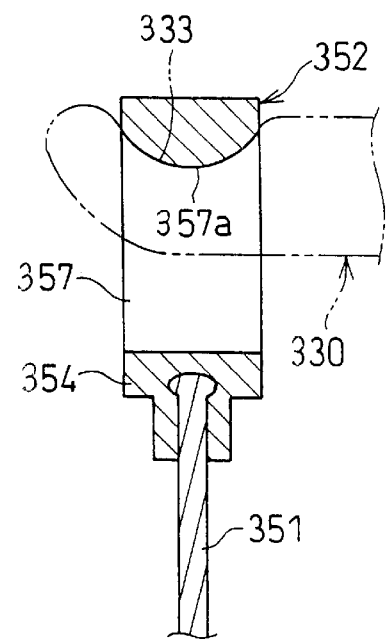
FIG. 7C is a cross-section view of FIG. 7B taken along the line VII—VII.

FIGS. 7A–7C show another embodiment wherein the brake lever 330 is comprised of one plate. In this fourth embodiment, the nipple 352 is characterized in that an outline of the nipple body 354 is rectangular and an insertion hole 357 is formed in its middle. Further, a section of the nipple body 354 to be disposed on the arc-shaped groove 333 of brake lever 330 is designed to be a semicircular surface 357a and may be integrally formed by aluminum die-casting. Here, the width of the nipple body 354 is designed to be slightly narrower than the width of the space 342 between the facing plates 340a and 340b of the strut 340.

An entire length of strut may be shortened without lowering the lever ratio of the mechanical shoe actuating mechanism by designing the space formed between two facing plates of the strut such that its upper half side is longitudinally wider than its lower half side. Therefore, this invention enables to design the mechanism not only to be smaller but also to improve the lever-ratio at the same time.

Especially, since an entire length of the mechanical shoe actuating mechanism is substantially shortened and compactly-designed, this invention is suitable for a drum brake utilized in a small size vehicle and has a significant economic effect.

The space of the strut may be formed simultaneously at the time the strut is formed by press. This facilitates the forming process and reduces the manufacturing cost.

The grooves on one ends of brake lever and the nipple of the brake cable are designed to be semicircular, thus providing an engagement between the facing surfaces and allowing smooth movement. Therefore, durability of the engagement section increases, and the inner cable under the nipple is not repeatedly deflected when operating the parking brake.

This invention maintains a low amount of horizontal movement in the pivot section between the brake lever and the strut even if the section makes a slight yawing movement, thereby providing assured engagement of the nipple and the inner cable with the brake lever.

A funnel-shaped or flared-out portion may be formed at an entry portion of the strut into which a nipple of the brake cable is inserted. This facilitates an insertion of the nipple into a drum brake already installed onto the vehicle with a brake drum and gives superior brake cable installability. It is readily apparent that the above-described has the advantage of wide commercial utility. For example, this invention is generally applicable to a brake with two separate brake levers. It may be understood that the specific form of the invention hereinabove described is intended to be representative only, as certain modifications with the scope of these teachings will be apparent to those skilled in the art.

Accordingly, reference should be made to the following claims in determining the full scope of the invention.

What is claimed is:

1. A brake cable-fixing device for a parking brake used in a mechanical shoe actuating mechanism comprising: a brake lever having a cable attachment portion to receive a cable end nipple thereon formed along one end and a first engagement groove adapted to engage a first brake shoe formed along another end; a strut defined by a pair of facing plates adjacent both ends of said brake lever, said strut having a second engagement groove adapted to engage a second brake shoe formed along one end of the facing plates and a pivot section pivotally supporting said brake lever at another end, whereby said brake shoes are spread apart as a pulling force generated by a parking brake cable is applied on said cable attachment portion of said brake lever; a strut space for receiving said cable end nipple during assembly is defined by said pair of facing plates of said strut, an upper portion of said strut space is longitudinally wider than a lower side of said strut space, whereby as said cable end nipple is inserted into an entry space formed longitudinally between outer edges of said brake lever and an interfitting portion of said strut, said cable end nipple inclinedly passes through said longitudinally wider upper portion defined between said facing plates.

2. The brake cable-fixing device as claimed in claim 1, wherein said space in the strut reserved for said nipple to pass through is designed to be longitudinally wider toward said upper side along outer edges of said brake lever along which said nipple advances in its connecting process.

3. The brake cable-fixing device as claimed in claim 1, wherein said strut has a restraining means to restrict a brake lever rotation in the opposite direction of said brake cable being pulled.

4. The brake cable-fixing device as claimed in claim 3, wherein said restraining means is a bridge crossing over said space between said facing plates of said strut.

5. The brake cable-fixing device as claimed in claim 3, wherein said restraining means is a plate spring, one end elastically connected with said strut and another end with said brake lever.

6. The brake cable-fixing device as claimed in claim 1, wherein said brake lever comprises two facing plates, wherein adjacent ends of said brake lever facing plates are formed with grooves having a gap in between to define said cable attachment portion; said nipple of said brake cable is installed on and engaged with said grooves; and said brake cable is inserted in said gap in between said facing plates.

7. The brake cable-fixing device as claimed in claim 1, wherein said brake lever is comprised of one plate, and said nipple of said brake cable has an opening to be hooked on said grooves of brake lever defining said cable attachment portion.

8. The brake cable-fixing device as claimed in claim 7, wherein said grooves of brake lever and said nipple of brake cable are matingly engaged on their semicircular surfaces.

9. The brake cable-fixing device as claimed in claim 1, wherein at least one projection is formed on at least one of a brake lever surface and a strut surface facing each other; and horizontal yawing movement of said strut relative to a pivot section of said brake lever is restricted by said projection.

10. The brake cable-fixing device as claimed in claim 1, wherein a funnel-shaped opening is formed at a lower portion of said strut into which said nipple of brake cable is inserted to define said entry space.

11. The brake cable-fixing device as claimed in claim 1, wherein said longitudinally wider upper portion is defined by a ramped surface at an interface of said pair of facing plates, said ramped surface being angled longitudinally away from said cable attachment portion.

* * * * *

UNITED STATES PATENT AND TRADEMARK OFFICE
CERTIFICATE OF CORRECTION

PATENT NO. : 6,581,729 B1  Page 1 of 1
DATED : June 24, 2003
INVENTOR(S) : Koji Moriwaki It is certified that error appears in the above-identified patent and that said Letters Patent is hereby corrected as shown below:

Title page,
Insert Item,
-- [30] Foreign Application Priority Data:
November 11, 1999,   Japan   11-321609 --

Signed and Sealed this

Sixteenth Day of December, 2003

JAMES E. ROGAN
*Director of the United States Patent and Trademark Office*